Figure 1:
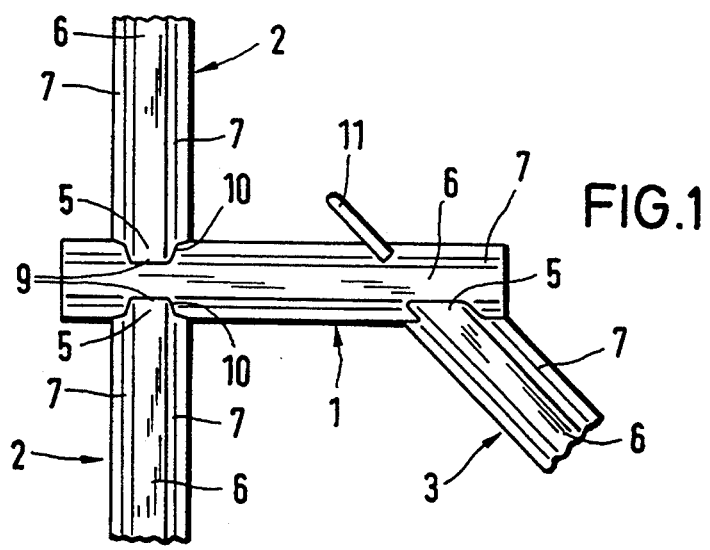

United States Patent [19]

Glaser

[11] Patent Number: 5,448,870
[45] Date of Patent: Sep. 12, 1995

[54] TRANSOM CONSTRUCTION

[75] Inventor: Siegfried Glaser, Beverungen, Germany

[73] Assignee: Helmut Lingemann GmbH & Co., Germany

[21] Appl. No.: 127,129

[22] Filed: Sep. 27, 1993

Related U.S. Application Data

[63] Continuation of Ser. No. 760,067, Sep. 13, 1991, abandoned.

[30] Foreign Application Priority Data

Dec. 21, 1990 [DE] Germany ............... 40 41 161.3
Feb. 25, 1991 [DE] Germany ............... 9102189 U

[51] Int. Cl.⁶ .................................................. F16S 3/04
[52] U.S. Cl. .................................. 52/665; 52/668; 403/205; 403/403
[58] Field of Search ............... 52/456, 663, 665, 669, 52/314, 507, 668; 403/231, 256, 263, 405.1, 409.1, 205, 403

[56] References Cited

U.S. PATENT DOCUMENTS

| | | | |
|---|---|---|---|
| 3,307,316 | 3/1967 | Gray | 52/665 |
| 3,308,593 | 3/1967 | Smith | 52/456 |
| 3,340,661 | 9/1967 | Krieger | 52/456 |
| 3,358,412 | 12/1967 | Martin | 52/665 |
| 3,372,522 | 3/1968 | Engstrom | 52/665 |
| 3,386,219 | 6/1968 | Beil | 52/665 |
| 3,474,587 | 10/1969 | Martin | 52/456 |
| 3,645,058 | 2/1972 | Jacobson et al. | 52/456 |
| 4,702,055 | 10/1987 | Ralph | 52/456 |
| 4,970,840 | 11/1990 | Ouellette et al. | 52/311 |

FOREIGN PATENT DOCUMENTS

| | | |
|---|---|---|
| 8418061 U | 10/1984 | Germany . |
| 8710362 U | 2/1988 | Germany . |
| 3638355 | 5/1988 | Germany . |
| 3941288 | 6/1990 | Germany . |

Primary Examiner—Michael Safavi
Attorney, Agent, or Firm—Jones & Askew

[57] ABSTRACT

The invention concerns a transom construction for the mounting between two glass panes, in particular window glass panes, in which the transoms that are assembled to form a transom cross consist of hollow profiles and at least two transverse profiles that are flush with each other are attached to a main hollow profile at a predetermined angle to create a transom cross and encompass the main profile in an overlapping manner. The connection of the hollow profiles to the transom construction is executed with the aid of connecting elements with insertion openings that extend in the longitudinal direction and can be solidly inserted into the transverse hollow profile. A four-edged connecting pin is also provided, which penetrates the insertion opening in the main hollow profile and is fitted into the recess in the connecting elements. The connecting elements which are attached to each other by the connecting pins in a solid manner create a highly rigid skeleton that allows the use of very thin hollow profiles for transom construction.

22 Claims, 3 Drawing Sheets

TRANSOM CONSTRUCTION

This is a continuation of application Ser. No. 07/760,067, filed Sep. 13, 1991, now abandoned.

The invention concerns a transom construction.

For some time now it has become more and more popular to provide insulating windows with transom constructions that are arranged between the glass window panes to maintain the style. For this purpose hollow profiles that most of the time consist of aluminum with a coat of lacquer are connected to form a transom construction. Earlier solutions for this problem suggested connecting the ends of the hollow profiles which were cut as miter joints to the side of the hollow profile that served as the main transom as a brace in such a way that the end that was cut as a miter joint could be inserted in a flush manner in a side recess of the main transom that was correspondingly cut as a miter joint. A connecting element of plastic or steel that was fitted into the hollow profile served for the invisible connection of the hollow profiles that were assembled in a flush manner.

One disadvantage of this known transom construction was the fact that the necessary miter cuts of both profiles to be connected were very crucial and, even if the miter cuts were executed exactly, resulted in a visible edge that left a disturbing impression, especially after a certain period of time.

This disadvantage was the reason for the introduction of another sort of connection, in which the miter cuts were omitted and only the side edges on the end of the hollow profile that serves as the transverse transom were cut off diagonally, so that an upper and lower end section were created by means of which the side edge of the main transom could be encompassed in an overlapping manner. The edges of the two overlapping sections were furthermore chamfered and adapted to a side chamfer of the main transom in such a way that the sections adjoined the surfaces of the hollow profile to which they were attached without a gap. Two round metal pins served as connecting elements for which corresponding penetration openings were machined into the main transom, so that transverse transoms could be attached on both sides. These pins were fitted into inwardly arranged round grooves of the transverse transom to be attached, in which these round grooves were constructed in a penetrable manner in both side areas of the flat profile.

The advantage of this solution could be seen in the fact that the overlapping sections of the transverse transoms to be attached did not have to be constructed quite as precisely. Furthermore, the thus far disturbing gap was eliminated. However, a disturbing fact was the construction of the mounting grooves on the inside of the hollow profiles that served as transverse transoms. The bores for the penetration of the round metal pins also had to be machined very exactly, because otherwise the exact fit of the premachined round grooves was not obtained or the attached elements only aligned according to the round pins, or the round grooves respectively, and material displacements occurred. If non-right-angled connections were desired, it was furthermore hardly possible to machine the round bores for this purpose, so that other costly attachment methods (for example attachment by bonding) had to be applied.

Furthermore, the machining of bores in wider transom constructions is very demanding, because the drill, or the milling tool respectively, was displaced and the bores had to be machined separately from both sides.

In order to ensure a stable transom construction that is in particular secured against bending, it was necessary to use thick-walled profiles as in earlier connection methods, all of which had to manufactured in press processes. The entire construction was thus not only costly, but also very difficult.

The invention is based on the objective to create a transom construction of the initially mentioned kind which allows the utilization of lighter and thin-walled profiles without special internal centering and still ensures sufficient stability.

The nature of the invention thus consists of a highly rigid connection of the two opposing transverse hollow profiles of a transom cross with each other. This highly rigid connection is based on a skeleton construction that includes a connecting element in each of the hollow profiles, as well as a pin that connects the connecting elements with each other in a rigid manner. The stability of this skeleton construction makes it possible to use extremely thin profiles for the transverse as well as the main transom of the transom cross, since the same are not part of the connection of the transom elements itself. The profiles rather have the purpose of an outer skin that is pushed over the skeleton construction and held together by the same. Deformations, bending and a separation of the profiles is thus almost impossible, even with the use of very thin profile materials that can now for the first time be utilized for transom constructions of this sort.

According to the invention, the alignment of the main hollow profile against the transverse hollow profile is executed by the special dimensions of the insertion openings for the pin in the main hollow profile. According to the invention, these insertion openings are dimensioned in such a way that the pin is guided in the transom cross level generally without any play, but is guided with transverse play to this level. In this case the exact guidance of the connecting pin in the transom cross level causes the desired alignment of the main hollow profile against the transverse hollow profiles, for example at an angle of 90°. However, transverse to the transom cross level the main hollow profile has some play in relation to the connecting pin penetrating this profile and thus in regard to the transverse hollow profiles opposing each other. This fact results in the advantage that the transverse hollow profiles adjoin the counter contour of the main hollow profile very neatly with its own contours and without causing deformations. The reason for the play can immediately be seen in the fact that, if no play would be provided transverse to the transom cross level, the very thin-walled profile would be forcefully deformed caused by material tolerances or inaccurate manufacturing. The previously mentioned play eliminates this disadvantage.

According to the invention, the utilization of thin-walled profiles is made possible because the stabilization against bending no longer has to be obtained by the hollow profiles connected with the aid of pins themselves, as the current state of technology prescribes, but by the fact that the connecting forces act upon the connecting elements themselves. In this case it can be advantageous if the frontal surfaces of the connecting elements opposing the main hollow profile extend parallel to the narrow side of the main hollow profile and immediately adjoin the same. According to an advantageous further development of this concept, it is suggested that extension sections that oppose each other and protrude vertically from the frontal surfaces of the connecting elements encompass the wider sides of the main hollow profiles, so that the two-dimensional contact surface between the connecting elements and the main hollow profile is increased. This two-dimensional attachment of the connecting elements to the main hollow profiles makes it possible that the connecting elements inserted into the transverse hollow profiles can take on the torque and rotation forces and thus do not allow the same to act upon the thin-walled end section of the attached main hollow profile. This is the reason why it is sufficient to only use a single connecting pin. This simplifies a diagonal, nonright-angled attachment of transverse hollow profiles to the main hollow profile.

According to a further advantageous development of the invention, the contour of the connecting element is adapted to the extent of the inner wall of the transverse hollow profile, in which the connecting element is preferably constructed as a solid longitudinal body. This fact results in a solid and secure connection of the connecting element with the corresponding transverse hollow profile. This construction characteristic also allows a better force transfer from the connecting elements into the transverse hollow profiles.

According to a particularly advantageous further development of the invention, the preferably single connecting pin is positively inserted into the press fitting of the corresponding connecting element. For this purpose a fitting bore is machined into the corresponding connecting element, whose wall is constructed complimentary to the contour of the pin. A polyhedral construction of the pin and the corresponding fitting bore contributes to an even more stable connection of the pin to transverse hollow profile. However, the preferred manner of construction is a four-edged construction of the pin, in particular a pin with rectangular, preferably square, cross section.

It is furthermore very advantageous if not only the pin is inserted into a press fitting of the connecting elements, but if the connecting elements are also inserted into a press fitting of the transverse hollow profiles. This is obtained by the fact that the connecting elements are provided with a slot that extends generally parallel to the fitting bore for the pin and penetrates the same, in which the connecting element is constructed like a straddling dowel in the slot area under a predetermined angle. During the insertion of a connecting element that is constructed in this manner into a hollow profile, a press fit connection between the connecting element and the corresponding hollow profile is obtained by the straddling effect of the slot section of the connecting element that is pressed together during the insertion. The press fit effect for the connecting elements, but also for the pin, can be increased in an advantageous manner by the fact that the fitting bore for the pin in the area of the connecting element slot is narrower when the connecting element is inserted into the side of the hollow profile than at the penetration end for the pin. This increases the straddling effect of the slotted connecting elements when the pin is inserted and in turn increases the positive press fit of the pin in the bore of the connecting element.

The construction of the connecting pin as a polyhedral pin, in particular as a four-edged pin with rectangular cross-sectional profile, has the major advantage that the insertion openings for the pin in the main profile do not allow any play in the transom cross level, but transverse to the same if all elements are constructed with the measurements according to the invention. With the use of a pin with a rectangular cross section it is thus only necessary to machine a recess, for example by milling, originating from the narrow side of the hollow profiles, whose width corresponds with the thickness of the pin in longitudinal direction of the main hollow profile, and which is machined so deep into the main hollow profile that the height of the recess surpasses the thickness of the pin vertically to the longitudinal direction of the main hollow profile. This allows a guidance without play of the rectangular connecting pin in the transom cross level, while the pin is guided with play transverse to this level.

The previously mentioned recesses in the main hollow profiles are considerably easier to realize than the round bores prescribed by the current state of technology, particularly if the preferred thin-walled profiles are used which can be produced in a cost efficient rolling process. The advantages can be seen in the simpler and quicker processing, in which milling or sawing is much easier than drilling the main hollow profile on the higher edge. In addition to this, no fastening and drilling devices are necessary for the machining of the recesses or the penetration openings, and the deformation forces during the machining of the recesses are very minute. Compared to the round bores in which the consequent measurement has to be considered, the machining of recesses does not depend on consequent measurements. The recesses that form the insertion openings in the main hollow profile can also be machined very easily in nonright-angled arrangements. Any arbitrary angle is possible for the intersection points.

The manufacturing of the connecting elements that preferably consist of plastic or other materials (for example injection molding elements) and their fitting into the ends of the hollow profiles by manufacturing according to the inner contour of the hollow profiles also does not necessitate high technological efforts. Depending on the inner cross section of the profiles, a fitting by several fitting surfaces, maybe even in combination with a groove, is utilized in which the outer contour of the connecting element adapts itself to the inner contour of the transverse hollow profile. The construction of the connecting element or the negative elements can be executed differently in such a way that a friction-tight connection and solid fit in the hollow profile is obtained. The friction-tight connection can be obtained by friction ribs, press fittings, and so forth. If two inwardly located side stabilization beads are furnished in the profile during the rolling process, corresponding grooves as receptacles for the beads are provided on both sides of the connecting element. According to a special further development, a burr can be arranged in the front area between the protruding end sections of the connecting element bordering on the pin recess, in which the burr adapts itself to the indentation on the outer edge of the main hollow profile that was caused by the bead.

It is furthermore advantageous if friction ribs are arranged on all four sides of the connecting elements, so that the same can be inserted into the hollow profiles positively and solidly in the manner of a press fitting.

The process for the manufacturing of the transom construction according to the invention can be easily executed. One connecting element each is fitted into the ends of a transverse hollow profile that has to be attached to a main hollow profile, in which a connecting pin was previously inserted into this connecting element. The connecting pin is then inserted through the corresponding recess in the main hollow profile, in which the front side and the protruding end section or overlapping section of the connecting element adjoin the open end of the attached profile of the main hollow profile two-dimensional and encompasses the same.

According to a further advantageous development of the invention, the connecting elements are inserted into the hollow profiles before the milling of the counter profiles. This provides a massive end of the hollow profile, and a practically solid material consisting of two different materials is created. The advantage can be seen in the fact that the profiles can be clamped down better during the milling of the counter profiles. This fact is particularly important with very thin-walled profiles that are very hard to process without attached connecting elements. It furthermore creates an exact fitting for the attachment onto the continuous main transom. If a nonright-angled attachment is desired, the necessary cuts through the hollow profile can be executed with the connecting element in clamped down position. The counter milling is executed in corresponding manner under any arbitrary angle.

Figure 2:
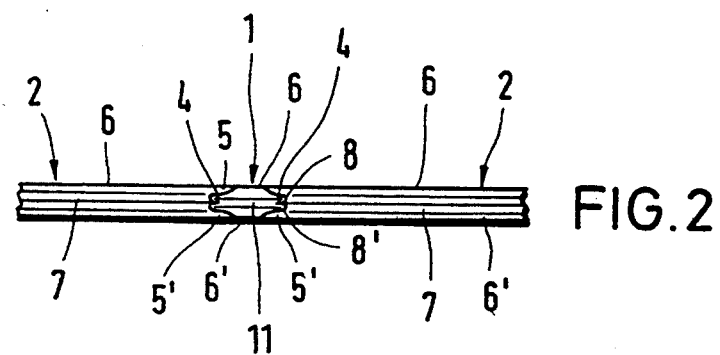
Figure 3:
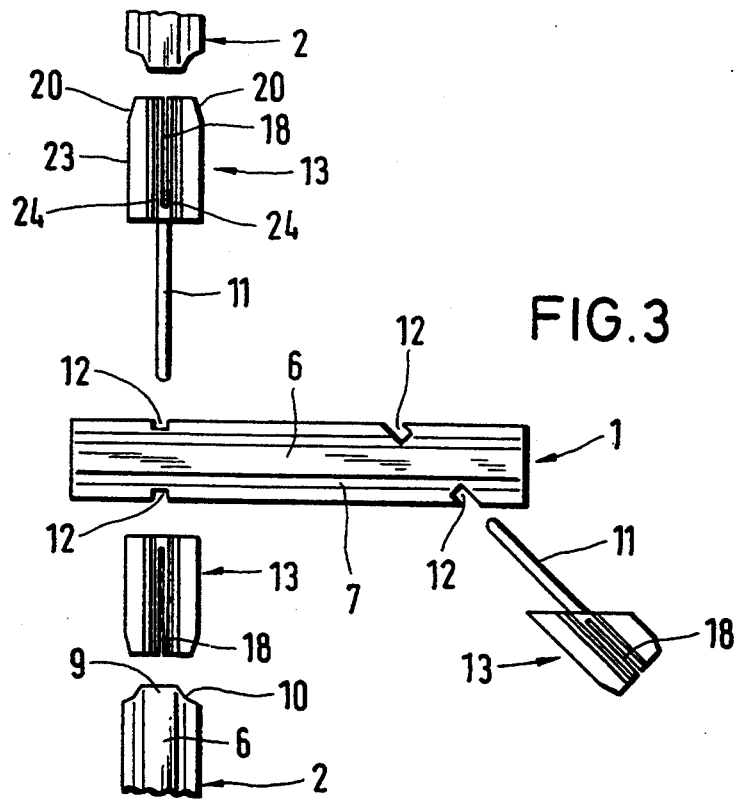
Figure 4:
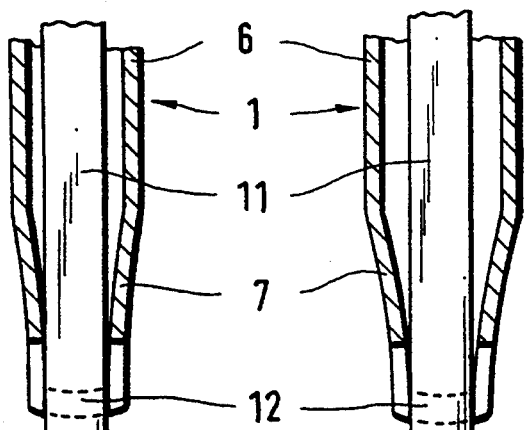
Figure 4:
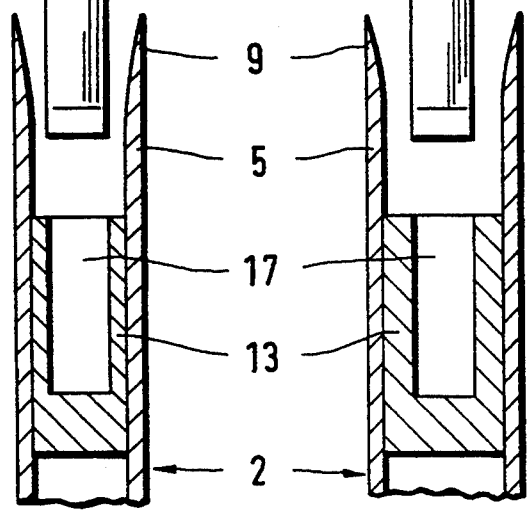
Figure 5:
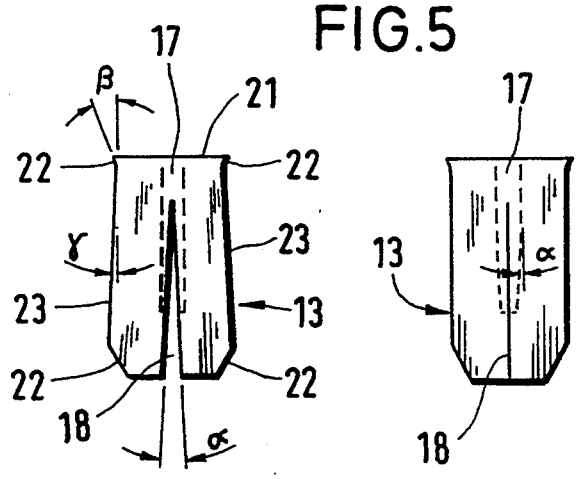
Figure 6:
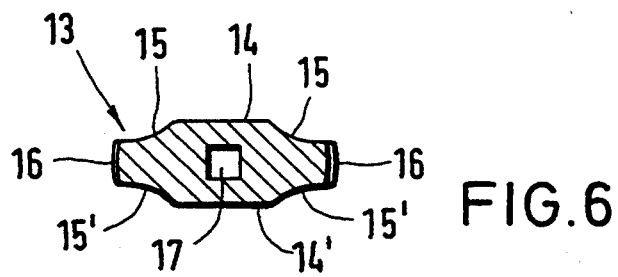
Figure 7:
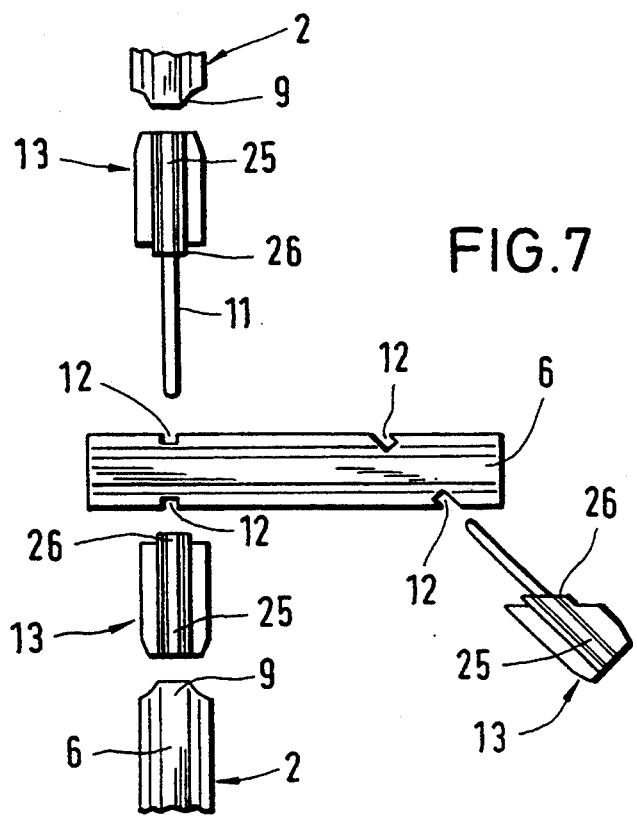
Figure 8:
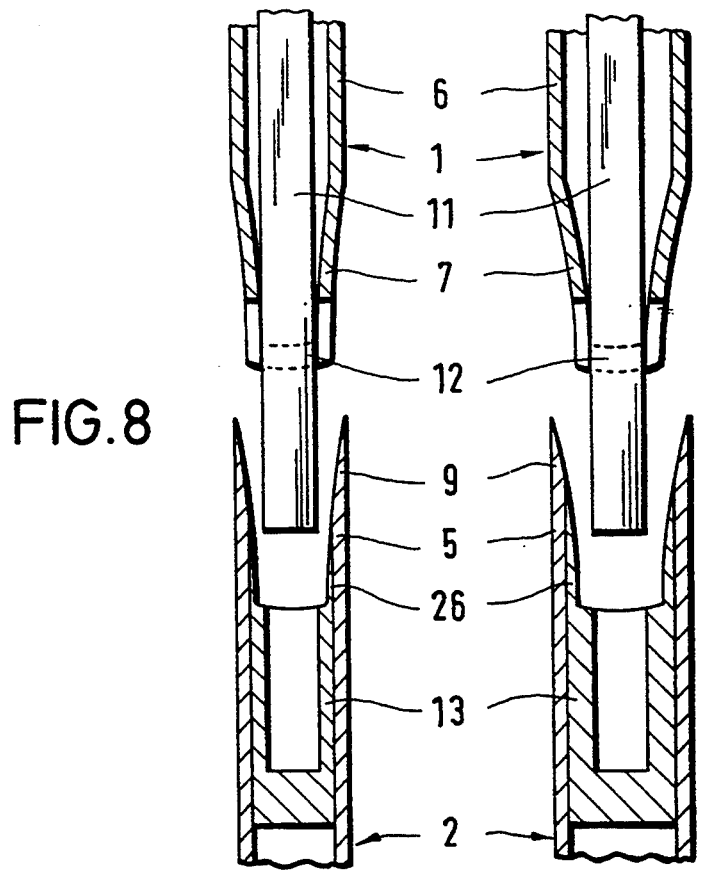

The invention is described more closely in the following with the aid of drawings; they show:

FIG. 1 a section of the transom construction according to the invention with right-angled and diagonally attached transverse hollow profiles, FIG. 2 a side view of the transom construction according to FIG. 1, FIG. 3 the single elements of the construction according to FIG. 1 before being connected, FIG. 4 a sectional view of the main hollow profile with inserted four-edged pin and a hollow profile with connecting elements to be attached for two different profiles, FIG. 5 a preferred example of the connecting element according to the invention, FIG. 6 the connecting element according to FIG. 5 in cross section, FIG. 7 a further example of the single elements of the construction according to FIG. 1 before being connected in the same representation as in FIG. 3, and FIG. 8 a sectional view according to FIG. 4 with utilization of the connecting element according to FIG. 7.

FIG. 1 shows an example of a transom construction that includes a main hollow profile (1) that consists of metal and serves as the main brace or main transom, two vertically arranged bracing profiles or transverse hollow profiles (2) and a diagonally arranged hollow profile (3). The hollow profiles (1, 2, and 3) are manufactured in a rolling process and are constructed identically. The rolling of the raw metal of which the profiles consist is executed in such a way that an internal bead or crease (4) is arranged on both longitudinal sides of the profile which contributes to the stability of the profile. The special cross-sectional form of the profiles (1, 2 and 3) can be seen in FIG. 2, which represents a side view of the left half of the transom construction illustrated in FIG. 1, namely a view of the two transverse profiles (2) that are arranged on the left side in FIG. 1, all of which are milled into contour like the hollow profile (3) in such a way that an upper and lower section (5 and 5') result that encompass the main hollow profile (1) from the side in an overlapping manner. The illustration chosen in FIG. 2 results in a view of the main hollow profile (1) that corresponds with the profile cross section. In this particular instance the two side beads (4) can be seen which are arranged in a level that extends vertically to the level of the drawing and represent one of the two mirror-symmetric levels of the profiles (1, 2 and 3). The second mirror-symmetric level extends vertically to the first-mentioned one through the two wider sides of the profile. The wider sides of the profile include two face surfaces (6 and 6') that extend parallel to each other, as well as two transverse surfaces (7 and 7') that extend and connect to the narrow sides of the profile and are curved in a concave manner. The contour of the narrow sides of the profile results from the internal bead construction as a rounded transfer section (8 and 8') from the transverse surfaces (7 and 7') towards the beads (4 and 4').

The contour milling on the connecting ends of the transverse hollow profiles (2) and the hollow profile (3) is chosen in such a way that a protruding part (9 and 9') of the face surface of these profiles adjoins the transition edge of its face surface (6 or 6') and the transverse surfaces (7 and 7') that are connected to the same. The front edge of the protruding part (9 or 9') thus extends in a linear manner, namely vertically towards the longitudinal axis of the profile. Recessed side edges (10) are connected to the protruding part (9 and 9') which adjoin the transverse hollow profiles attached to the main hollow profile (1) with their cut edges and the transverse surfaces (7 and 7') that extend in a convex manner. The transverse extending edges (10) extend up to the connecting ends of the narrow sides of the transverse hollow profile, in which the narrow sides that extend in a linear manner are cut in such a way that they adjoin the narrow sides of the main hollow profile (1).

A view of the narrow sides of the transverse hollow profile in the area of the connecting ends thus results in a generally U-shaped extent, in which the limbs of the U-shaped contour milling are bent correspondingly. A view of the wider side of the transverse hollow profile in the area of their connecting ends results in a generally trapezoidal profile extent.

The previously described shape of the hollow profile is intended to produce a visual effect. However, the shape is not binding. All other possible generally right-angled cross-sectional shapes can be applied.

A main factor of the transom construction described is the fact that a skeleton construction is chosen that allows the utilization of hollow profiles with considerably lower wall thickness than conventional hollow profiles that have thus far been used for transom constructions. The skeleton construction described more closely in the following is particularly intended to allow utilization of profiles with up to 10 times lower wall thickness as conventional transom constructions.

One element of the skeleton construction, namely a connecting pin (11), is illustrated in FIGS. 1 and 2. The connecting pin (11) penetrates the main hollow profiles (1) in transverse direction, in which the narrow sides of the main hollow profile are provided with insertion openings (12), as it can be seen in FIG. 3 which represents an exploded view of the elements of the transom construction according to FIG. 1, in which the connecting pin (11) is inserted into connecting elements (13), which in turn are inserted into the connecting ends of the transverse profile in a manner described more closely in the following.

FIGS. 3 through 6 illustrate that the connecting element is constructed as a solid body whose contour is adapted to the contour of the inner wall of the profile, as it can be seen best in the cross section in FIG. 6. The connecting elements (13) that are constructed in a complementary manner to the hollow profiles are provided with two flat face surfaces (14 and 14') that oppose each other, as well as transverse surfaces (15 and 15') that adjoin the same toward the sides and are curved in a convex manner corresponding to the transverse surface (7) of the hollow profiles. The side surfaces (16) in the example according to FIG. 6 are only roughly adapted to the inner contour of the hollow profiles that are provided with beads (7 and 7') and rounded surfaces (8 and 8') in these locations which, together with the central beads, have an extent that is similar to the curved shape of a B. The side surfaces (16) are not provided with these fine contours, which is the reason that the extent in width of the connecting element (13) from the side surface (16) to the side surface (16) approximately corresponds with the inner distance between the beads (4) in the main hollow profile that oppose each other. As an alternative to this solution it can be suggested that the mentioned extent in width of the connecting elements (13) is chosen in such a way that it corresponds with the distance of the narrow sides of the inner walls of the hollow profiles. In this particular instance the side walls (16) of the connecting elements (13) are provided with recesses at those locations with which it borders the beads (4). This fact results in a surface contact of the connecting elements (13) with the inner walls of the corresponding hollow profile on all sides.

The sectional illustration of the connecting elements (13) in FIG. 6 shows that a bore (17) is provided in the center of the connecting element, which serve as a receptacle for the connecting pin (11) and has a cross-sectional form that is adapted to provide an exact fit for the corresponding connecting pin. The cross-sectional shape illustrated in FIG. 6 is preferred, namely a square cross section of the bore (17), as well as a correspondingly square cross section of the connecting pin (11).

In order to ensure a solid fit of the connecting pin (11) in the receptacle bore (17) of the connecting element (13), as well as to simultaneously ensure a solid fit of the connecting element (11) in the connecting end sections of the transverse hollow profile, the connecting element (13) is constructed in the manner of a plastic straddling dowel, as it can be best seen in FIG. 5. The solid body of the connecting element (13) is provided with a slot (18) in the longitudinal direction which extends in direction of the central longitudinal axis of the connecting element (13). The base of the slot (18) is located in the front third of the fitting bore (17) for the pin (11) which also extends along the central longitudinal axis of the connecting element (13), namely with an extent that approximately corresponds with two thirds of the length of the connecting element (13). The fitting bore (17) is in other words constructed as a pocket hole. Originating from its base in the front part of the fitting bore (17) and viewed in insertion direction of the pin, the slot opens toward the opposing end of the connecting element (13) with an angle α, as it can be seen in the left half of FIG. 5. The right half of FIG. 5 shows the connecting element (13) completely inserted into the hollow profile, which is not shown in the figure, just like the pin (11) inserted into the fitting bore (17) in order to provide a better overview. It becomes clear that the linear extending fitting bore (17) in the relaxed position according to the left half of FIG. 5 has a steadily decreasing cross section in insertion direction of the pin (11) in compressed condition of the connecting element (13) according to the right half of FIG. 5 in the area of the slot (18), whose V-shaped spread has been completely overcome. The narrowing of the bore may be generally conical. With the pin inserted, this leads to the effect that the potential straddling force of the connecting elements (13) in inserted condition is supplemented by the straddling force executed onto the fitting bore (17) in the slot area through the slot on the walls of the bore transverse to the insertion direction of the pin (11), all of which is caused by a compression of the material of the connecting element (13) in the slot area of the fitting bore. This results in an excellent press fit of the connecting elements (13) in the corresponding hollow profile, as well as an equally excellent press fit of the pin (11) in the fitting bore (17).

FIG. 5 also shows that the connecting element (13) is tapered by an angle β on its front end in the insertion direction. For this purpose it is provided with tapered side wall parts (20). These parts are preferably arranged on the side walls (16), as well as on the face surface (14) and maybe even on the transverse surfaces (15). This wedge-shaped construction of the front end of the connecting element allows a simpler insertion into the connecting end of the corresponding transverse hollow profile, which is caused by the straddled construction of the connecting elements.

Seen in the insertion direction, the area of the rear surface (21) of the connecting element (13) is constructed in an expanded manner by transverse surfaces, namely the surfaces (20), whose extent is constructed in a complementary manner to the transverse surfaces (20). This leads to a particularly advantageous press contact of the connecting element (13) on its outer ends. Transverse extending wall parts (23) in the area of the side walls (16) extend between the transverse surfaces (22) on the rear end and the transverse surfaces (20) on the front end of the connecting element (13). These wall parts extend at an angle γ, which is half as large as the opening angle α of the slot (18), and these wall parts (23) assume a parallel alignment with the side walls of the profile when the connecting element (13) is inserted into a transverse hollow profile, analogous to the manner of operation of a plastic straddling dowel. The inner ends of the connecting elements may be chamfered inwardly in a generally conical taper to assist inserting the connecting elements into a transverse hollow profile.

The example of the connecting element (13) shown in FIG. 3 corresponds with the construction of the connecting element in FIG. 5, with the difference that the transverse walls (22) located on the front in the example according to FIG. 3 are not provided, as well as with the difference that the longitudinal slot (18) extends up close to the face wall of the connecting element (13) on the insertion side. The connecting element (13) is illustrated in FIG. 3 in the condition that it assumes when it is inserted into the hollow profile (2), which means after overcoming the originally spread condition of the connecting element (13), as is shown in the left half of FIG. 5. Grooves (24) extend in the face surface (14 and 14') of the connecting element (13) to the left and the right of the slot (18) and parallel to the same, in which these grooves extend over the entire length of the connecting element (13) and end at the corresponding frontal surface. These grooves cause a certain elasticity of the connecting element (13) in the transverse direction, which means in the direction toward its two narrow sides (16), in which this elasticity simplifies the insertion of the connecting element into the corresponding hollow profile.

FIG. 4, in connection with FIG. 2, illustrates that the frontal surface of the connecting element (13) ends flush with the edges of the recessed narrow sides of the hollow profile, which is the base of the U-shaped profile cross section in a view of the narrow sides of the connecting end of the profile. This fact results in a larger contact surface between the frontal connecting element surface and the opposing narrow Sides of the main hollow profile. FIG. 4 furthermore shows that the length of the connecting pin (11) and the depth of the fitting bore (17) are chosen in such a way that the pin and the connecting elements form a rigid and very stiff skeleton when the pin is completely inserted into the connecting element without the fact that the hollow profiles (1 and 2) also execute a fitted connection. If the skeleton elements (11 and 13) are entirely connected, the transverse hollow profiles (2) overlap the main hollow profile (1) in an optically perfect manner, but the hollow profile elements do not execute any forces on each other. The hollow profiles rather represent a surface layer that serves for the optical connection of the skeleton construction, in which this surface layer is not exposed to any deformation forces. This is the reason why the hollow profiles of the previously described transom construction can be constructed considerably thinner as in transom construction according to the current state of technology in which the hollow profiles also have a support function.

FIG. 4 and the center section of FIG. 3 illustrate that the penetration openings (12) in the main profile (1) have dimensions in the level of the drawing, which means the level of the transom cross, which approximately correspond with the thickness of the connecting pin (11) in this level. This fact obtains a fit without play of the pin (11) in the level of the transom cross, which leads to the fact that the predetermined angle of the cross is exactly maintained. On the other hand, the pin (11) is fitted with play in the insertion openings (12) vertically to the level of the transom cross. This is obtained by the fact that the insertion openings generally extend up to the face surfaces (6 and 6') of the main hollow profile, as well as over the entire width of the narrow sides of the main hollow profile. This results in the following shape of the insertion opening (12). A view of the narrow sides of the main hollow profile (1) shows that the penetrations have a rectangular shape, in which the narrow side of the rectangle extends in longitudinal direction of the main hollow profile (1) and corresponds with the thickness of the pin (11), while the wider sides of the rectangle exceed the thickness of the pin; a view of the wider sides of the main hollow profile (1) shows that the insertion openings (12) for the pin (11) extend in a U-shape, and that the base of this U-shape is recessed from the outer edge of the hollow profile by a certain distance, preferably up to the face side (6) of the hollow profile (1) or at least up to the center of the corresponding transverse surface (7). It is very important that the base of the U-shape does not extend so far into the main hollow profile that its structure would be weakened, or that the protruding part (5) of the now entirely attached transverse hollow profile (2) is covered.

It would also be possible to provide two or more pins for the rigid connection of the connecting element (13) with each other, although this fact would not be necessary to increase the stability of the skeleton.

FIGS. 7 and 8 show an altered example of the transom construction in the same view and arrangement as the transom construction according to FIGS. 3 and 4, in which only the differences compared to the arrangement according to FIGS. 3 and 4 will be discussed.

The main difference of the transom construction according to FIGS. 7 and 8 compared to the previously described transom construction is the different construction of the connecting elements (13). The connecting element (13) according to FIGS. 3 and 4 are not provided with a longitudinal slot and have a contour with a protruding part on its front end, as it will be described more closely in the following.

FIGS. 7 and 8 show that the connecting elements are shaped in such a way that they are fitted into the end of the linear or transverse attached hollow profile from the top, bottom and the sides with altogether four fitting surfaces. The upper and lower fitting surface (25) are divided by two grooves and extended to form an end section (26) that protrudes over the frontal surface of the connecting element (13) that was attached to the hollow profile (1), in which this end section consists of three single segments which adjoin the main hollow profile (1) in a two-dimensional manner, similar to the overlapping sections (5). This segment construction makes it possible to obtain a spring-like attachment to the upper and lower side of the main hollow profile, even if less elastic plastics are used or if the segments have a larger wall thickness.

The sections (26) are constructed somewhat shorter than the overlapping sections (5) of the transverse hollow profiles (2 and 3), so that they are invisible after connection of the profile elements. The connecting elements (13) that are constructed of plastic, for example in an injection molding process, receive the pins (11) in exactly machined four-edged recesses in the manner of a press fit, as previously described.

In order to obtain an even better fit of the connecting elements (13), their side surfaces are not only provided with grooves for the reception of the beads (4), but are provided with a chamfer parallel to the face sides of the connecting elements, in which this chamfer fits into the recess on the outer side of the hollow profile (1) that is created by the beads (4), as it can be seen in FIG. 2.

To further improve a solid fit of the connecting elements (13), friction ribs that extend in the insertion direction are arranged on the face sides (14 and 14') and the side walls. This fact reduces the demands set forth for the precision and the manufacturing and processing of the hollow profiles, as well as the connecting elements.

The shape of the main and transverse hollow profiles and the fitting of the attached connecting elements are not limited to the described solution. Depending on the requirements, different solutions and other forms of fittings can be chosen. It is also possible to adapt the form of the connecting element only very roughly to that of the hollow profiles and to use a hardening plastic mass for the solid fitting of the connecting elements. The same is also valid for the insertion of the one or more pins into the connecting elements. In order to shape the plastic connecting elements, form or contour milling tools are used. This is also valid for the production of the sections (4, 4') of the hollow profiles. The length of the connecting elements (13) depends on the width, as well as the wall thickness of the profiles (1, 2 and 3). The same is also valid for the length of the overlapping sections (26). Depending on the side and the wall thickness of the hollow profiles, the fitting and the material chosen for the connecting elements can have different dimensions with the advantageous effect of a force transfer onto the connecting elements and stabilization of the connecting area.

I claim:

1. In a transom construction with main struts (1) and cross struts (2 or 3) comprising identical hollow profiles having two wide side walls and two narrow side walls, and bevels extending from the wide side walls towards the narrow side walls, wherein two laterally attached cross struts (2 or 3) are connected with a main strut (1) having a longitudinal direction and a transverse direction, each narrow side wall of the main strut (1) being provided with a through-hole (12), a pin (11) protruding out of both sides of the main strut (1) and penetrating into the through-holes, the ends of the pin (11) being situated in holes of clamping elements (13), and the clamping elements (13) being adapted to an inner contour of the cross struts (2 or 3) and situated in the end area of a cross strut (2 or 3) with a press fit, the improvement comprising:

the wide side walls of the cross struts (2, 3) have face edges with sections (5, 5') which overlap the bevels of the wide side walls of the main struts (1);

the through-holes are formed by rectangular recesses that are cut at an angle to the longitudinal direction of the main strut (1) and extend into the wide side walls;

the width of said rectangular recesses in the longitudinal direction of the main strut (1) is configured to receive the diameter of the pin (11) without substantial play; and the width of the rectangular recesses in a transverse direction of the main strut (1) is configured to provide a certain amount of play for the pin (11), such that the sections (5, 5') may be placed against the outer contour of the wide side walls of the main strut (1) without constraint.

2. Connecting device according to claim 1, wherein the pin (4) is fitted with a press fit in a blind hole in the clamping elements (13).

3. Connecting device according to claim 1, wherein the pin (11) is fitted with a fictional fit in a blind hole in the clamping elements (13).

4. Connecting device according to claim 1, wherein the pin (11) is a square pin.

5. Connecting device according to claim 1, wherein the clamping elements (13) are fitted into the cross struts (2 or 3) with a frictional fit.

6. Connecting device according to claim 1, wherein the clamping elements (13) are fitted into the cross struts (2 or 3) with a press fit.

7. Connecting device according to claim 1, wherein the cross struts (2 or 3) each have an end section (9, 9') which is formed at and protrudes beyond the clamping elements (13) situated in the end area of the cross strut, and the end sections are arranged behind the sections (5, 5') of the cross struts (2 or 3) in an extension of a face side of said clamping elements, whereby the end sections lie flatly on the main strut (1) and are shorter than the sections (5, 5').

8. Connecting device according to claim 1, wherein the cross struts (2 or 3) and the main strut (1) are, on the narrow side walls, provided with an inner fold (5) extending in the longitudinal direction, and the clamping elements (13) have corresponding grooves on edge surfaces (10) to receive the folds (5).

9. Connecting device according to claim 1, further comprising chamfers extending in parallel with flat sides (14, 14') of the clamping elements (13) and arranged next to the recess for the pin (11) in a face side of the clamping element (13) adjoining to the main strut (1), and said chamfers fit into lateral depressions in the narrow side walls of the main strut (1).

10. A connecting device as in claim 1, wherein the through-holes are cut perpendicular to the longitudinal direction of the main strut.

11. A connecting device as in claim 1, wherein the through-holes are cut at an acute angle to the longitudinal direction of the main strut.

12. In a transom construction with main struts and cross struts comprising identical hollow profiles having two wide side walls and two narrow side walls and bevels extending from the wide side walls towards the narrow side walls wherein two laterally attached cross struts are connected with a main strut, each narrow side wall of the main strut being provided with a through-hole to accommodate a connecting element, a pin protruding out of both sides of the main strut and penetrating into the through-holes, the ends of the pin being situated in a receptacle hole of clamping elements, and the clamping elements being adapted to an inner contour of the cross struts and situated in the end area of a cross strut with a press fit, the improvement comprising:

the hole in each clamping element is, in a predetermined insertion direction of the pin, a conically tapered hole such that the clamping element is expanded perpendicular to the hole during the insertion of the pin into the hole and thus becomes wedged against the inner wall of the cross strut; and each clamping element has narrow side walls that are, in an area of a rear surface of the clamping element, widened laterally towards the outside and thus form a stopping element which prevents displacement of the clamping element into the cross strut when inserting the pin into the conically tapered hole of the clamping element.

13. Connecting device according to claim 12, wherein:

each clamping element has a longitudinal slot similar to a straddling dowel, whereby the slot exits into a front face edge of the clamping element in the insertion direction, penetrates the receptacle hole for the pin, ends before the rear face edge of the clamping element, and has the shape of a wedge in its relaxed condition, in which the clamping element is not inserted into the cross strut; and further comprising two clamping element limbs defined by said slot and extending with two parallel longitudinal side edges apart from each other in the direction towards the front face edge of the clamping element, whereby both limbs are parallel to the slot clamped against the inner walls of it narrow side of the cross struts due to the wedge effect caused by the closed slot when the clamping element is inserted into the cross strut.

14. Connecting device according to claim 12, wherein the receptacle hole in the clamping element for the pin is a blind hole.

15. Connecting device according to claim 12, wherein the receptacle hole in the clamping element for the pin is configured to provide substantially an exact fit with the pin.

16. Connecting device according to claim 12, wherein the pin and the receptacle hole for the pin have a square cross section.

17. Connecting device according to claim 16, wherein each clamping element is, in the area of its front face edge, tapered to define transversely extending guide surfaces.

18. Connecting device according to claim 12, wherein the stopping element, in the area of a rear face edge of the clamping elements, is defined by a border that protrudes over an outer contour of the clamping elements.

19. Connecting device according to claim 18, wherein the border is formed by slanted surfaces of an outer wall of the clamping element which have a transverse incline toward the rear face edge.

20. Connecting device according to claim 12, wherein the hole for the pin in the clamping element extends over approximately two-thirds of the length of the clamping elements.

21. Connecting device according to claim 13, wherein the slot in the clamping elements extends over approximately two-thirds of the length of the clamping elements.

22. A method for manufacturing a transom construction comprising at least one main strut (1) and cross struts (2 or 3) having identical hollow profiles with two wide side walls and two narrow side walls, and bevels extending from the wide side walls toward the narrow side walls, wherein two laterally attached cross struts can be connected with the main strut (1), each narrow side v/all of the main strut (1) being provided with a through-hole (12) for receiving a pin (11) protruding out of both sides of the main strut (1) and penetrating into the through-holes, so that ends of the pin (11) can be situated in a hole of a clamping element (13) adapted to an inner contour of the cross struts (2 or 3) and situated in an end area of the cross strut (2 or 3) with a press fit, comprising the steps of:

contour milling the cross struts to produce sections (5, 5') arranged on face edges of the wide side walls of the cross struts (2 or 3) and configured for overlapping the bevels of the wide side walls of the main strut (1);

sawing or milling through-holes through the narrow side walls of the main strut (1) and extending into the wide side walls for forming tetragonal recesses, the through-holes being perpendicular to or angled against the longitudinal direction of the main strut, whereby a width of said tetragonal recesses is, in the longitudinal direction of the main strut (1), configured to receive the diameter of the pin (11) without substantial play; and providing the width of the tetragonal recesses, in the transverse direction of the main strut (1), with a certain amount of play for the pin (11) such that the sections (5, 5') may, as the cross struts are connected with the main strut, be placed against the outer contour of the wide side walls of the main strut (1) without constraint.

* * * * *

UNITED STATES PATENT AND TRADEMARK OFFICE
CERTIFICATE OF CORRECTION

PATENT NO. : 5,448,870
DATED : September 12, 1995
INVENTOR(S) : Seigfried Glaser It is certified that error appears in the above-indentified patent and that said Letters Patent is hereby corrected as shown below:

Column 11, line 48, "fictional" should read --frictional--.
Column 12, line 65, "it" should be --a--.
Column 14, line 5, "v/all" should be --wall--.

Signed and Sealed this

Nineteenth Day of December, 1995

Attest:

BRUCE LEHMAN

Attesting Officer         Commissioner of Patents and Trademarks